(12) United States Patent
Fujitomi et al.

(10) Patent No.: US 8,434,585 B2
(45) Date of Patent: May 7, 2013

(54) ELECTRIC POWER STEERING SYSTEM AND VEHICLE STEERING SYSTEM

(75) Inventors: Toshiyuki Fujitomi, Yoshino-gun (JP); Minoru Sato, Okazaki (JP); Yoshiki Maruyama, Okazaki (JP); Motonari Ishizuka, Nagoya (JP)

(73) Assignee: Jtekt Corporation, Osaka-Shi (JP)

( * ) Notice: Subject to any disclaimer, the term of this patent is extended or adjusted under 35 U.S.C. 154(b) by 0 days.

(21) Appl. No.: 13/329,752

(22) Filed: Dec. 19, 2011

(65) Prior Publication Data

US 2012/0160595 A1 Jun. 28, 2012

(30) Foreign Application Priority Data

Dec. 24, 2010 (JP) ................................. 2010-288031

(51) Int. Cl.
*B62D 5/04* (2006.01)

(52) U.S. Cl.
USPC .......................................... 180/443; 180/444

(58) Field of Classification Search .................. 180/443, 180/444, 446
See application file for complete search history.

(56) References Cited

U.S. PATENT DOCUMENTS

| | | | |
|---|---|---|---|
| 4,940,102 A * | 7/1990 | Morishita | 180/446 |
| 5,341,891 A * | 8/1994 | Wada et al. | 180/445 |
| 6,041,885 A * | 3/2000 | Watanabe et al. | 180/444 |
| 6,543,569 B1 * | 4/2003 | Shimizu et al. | 180/444 |
| 6,585,074 B2 * | 7/2003 | Katou et al. | 180/428 |
| 7,308,964 B2 * | 12/2007 | Hara et al. | 180/446 |
| 2010/0126795 A1 * | 5/2010 | Tokunaga | 180/446 |

FOREIGN PATENT DOCUMENTS

| | | |
|---|---|---|
| DE | 203 21 454 U1 | 5/2007 |
| EP | 1 215 102 A2 | 6/2002 |
| GB | 2 389 088 A | 12/2003 |
| JP | U-60-36374 | 3/1985 |
| JP | A-06-092243 | 4/1994 |

OTHER PUBLICATIONS

Dec. 6, 2012 Extended Search Report issued in European Application No. 11195128.1.

* cited by examiner

*Primary Examiner* — Kevin Hurley
*Assistant Examiner* — Marc A Scharich
(74) *Attorney, Agent, or Firm* — Oliff & Berridge, PLC

(57) ABSTRACT

Provided are an electric power steering system and a vehicle steering system each including rack-and-pinion mechanisms (14A, 14B). A rack shaft (3) has a first rack (7A) and a second rack (7B) that are formed on the axially opposite sides of the axial center of the rack shaft (3). The first rack (7A) has a regular pitch p between rack teeth, the second rack (7B) has a regular pitch p between rack teeth, and these pitches p are equal to each other. A predetermined difference is set between the phase of gear teeth engagement between a first pinion shaft (8A) and the first rack (7A), which constitute the first rack-and-pinion mechanism (14A), and the phase of gear teeth engagement between a second pinion shaft (8B) and the second rack (7B), which constitute the second rack-and-pinion mechanism (14B).

8 Claims, 2 Drawing Sheets

ELECTRIC POWER STEERING SYSTEM AND VEHICLE STEERING SYSTEM

INCORPORATION BY REFERENCE

The disclosure of Japanese Patent Application No. 2010-288031 filed on Dec. 24, 2010 including the specification, drawings and abstract, is incorporated herein by reference in its entirety.

BACKGROUND OF THE INVENTION

1. Field of the Invention

The invention relates to an electric power steering system and a vehicle steering system.

2. Description of Related Art

There is an electric power steering system (EPS) for a vehicle, which includes a first pinion shaft that is rotated in response to an operation of a steering wheel and a second pinion shaft that is rotated by a motor. In such an electric power steering system, the first pinion shaft and the second pinion shaft are in mesh with a rack shaft, and the torque of the motor is applied to a steering system as assist force.

Japanese Utility Model Application Publication No. 60-36374 describes an electric power steering system in which a rack shaft has two racks that are formed on the axially opposite sides of the axial center of the rack shaft, and pinion shafts are in mesh with the respective racks.

Many in-vehicle components, such as an engine and a radiator, are concentrated in the lateral center area of an engine compartment. If the above-described structure is employed, contact between these in-vehicle components and a motor of the electric power steering system is less likely to occur, which makes installation of these components easier. In the example described above, the two racks differ from each other in pitch (interval between consecutive rack teeth). With this structure, the motor load is reduced.

In the meantime, in a rack-and-pinion mechanism constituted of a rack shaft and a pinion shaft, force that causes the rack shaft and the pinion shaft to move away from each other is produced by the meshing friction. Therefore, usually, the rack shaft is pushed against the pinion shaft by a known rack guide so that the rack shaft is kept in mesh with the pinion shaft. With regard to such a structure, refer to Japanese Patent Application Publication No. 06-92243, for example.

However, when two rack-and-pinion mechanisms are provided at one rack shaft as described above, the forces acting on the meshing points of the respective rack-and-pinion mechanisms may amplify each other. The vibrations that occur due to such force amplification may reduce the quietness of the operation of the electric power steering system.

As in the example case described above, if the two racks differ from each other in pitch, the state of gear teeth engagement (e.g., the positional relation between the tip of the tooth currently in engagement and the tooth bottom mating with this tooth tip, and the gear teeth engagement timing) between the rack and the pinion shaft of one of the two rack-and-pinion mechanism is not synchronous with that of the other rack-and-pinion mechanism. This prevents the vibrations caused by gear teeth engagements from continuously kept at high levels. However, the gear teeth engagement states of the two rack-and-pinion mechanisms may coincide, although depending upon the axial positions of the pinion shafts relative to the respective racks, with each other, thereby creating a state where the forces acting on the meshing points of the respective rack-and-pinion mechanisms both peak. Further, because the vibration level changes in accordance with the current steering angle within the entire steering angle range, there is a possibility that an occupant of a vehicle may easily feel the vibrations.

SUMMARY OF THE INVENTION

It is an object of the invention to provide an electric power steering system and a vehicle steering system with high quietness achieved by reducing vibrations caused by gear teeth engagements between two pinion shafts and respective racks over the entire steering angle range.

An aspect of the invention relates to a vehicle steering system, including: a plurality of pinion shafts that are individually provided; and a rack shaft that has a plurality of racks in mesh with the respective pinion shafts, and that is axially moveable. Each of the racks has a regular pitch between rack teeth, the pitches of the respective racks are equal to each other, and gear teeth engagement phases of the respective sets of the rack and the pinion shaft are offset from each other.

Another aspect of the invention relates to an electric power steering system that includes the vehicle steering system according to the above-described aspect of the invention. In the electric power steering system, the plurality of pinion shafts includes a first pinion shaft that is rotated in response to an operation of a steering wheel and a second pinion shaft that is rotated by a motor; the plurality of racks includes a first rack that is in mesh with the first pinion shaft and a second rack that is in mesh with the second pinion shaft; the first rack has a regular pitch between rack teeth, the second rack has a regular pitch between rack teeth, and the pitch of the first rack and the pitch of the second rack are equal to each other; and a phase of gear teeth engagement between the first pinion shaft and the first rack and a phase of gear teeth engagement between the second pinion shaft and the second rack are offset from each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
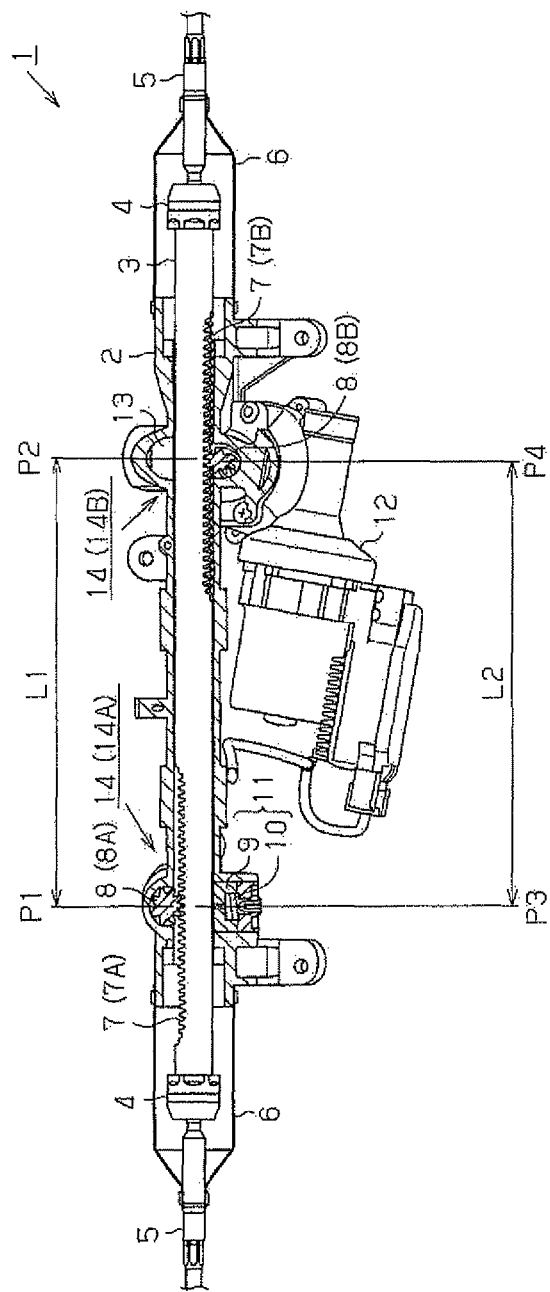
FIG. 1 is a sectional view schematically showing the structure of an electric power steering system (EPS)

Hereafter, an example embodiment of the invention will be described with reference to the accompanying drawings. As shown in FIG. 1, in an electric power steering system (EPS) 1 according to the example embodiment, tie rods 5 are connected, via ball joints (rack ends) 4, to the respective ends of a rack shaft 3 that is inserted in a generally cylindrical rack housing 2. In the example embodiment, the ball joints 4 are surrounded by elastic boots 6. The rack shaft 3 has two racks 7 (7A, 7B) that are formed on the axially opposite sides of the axial center of the rack shaft 3. In the example embodiment, the positions at which the respective racks 7 (7A, 7B) are formed are offset from each other by approximately 180 degrees in the circumferential direction of the rack shaft 3, that is, the rack 7A is on substantially the opposite side of the rack shaft 3 from the rack 7B in the circumferential direction. Two pinion shafts 8 (8A, 8B) that are in mesh with the respective racks 7 (7A, 7B) are rotatably supported by the rack housing 2 such that the pinion shafts 8 (8A, 8B) intersect with the rack shaft 3.

The first pinion shaft 8A shown in the left side of FIG. 1 is connected to a steering shaft (not shown). On the opposite side of the rack shaft 3 from the first pinion shaft 8A (the lower side in FIG. 1), there is provided a known rack guide 11 that is constituted of a support yoke 9 and an elastic member (coil spring) 10. The support yoke 9 is in contact with the peripheral face of the rack shaft 3 such that the rack shaft 3 is slidable on the support yoke 9. The elastic member 10 urges the support yoke 9 toward the first pinion shaft 8A. Therefore, the rack shaft 3 is pushed by the rack guide 11 with the first pinion shaft 8A in mesh with the first rack 7A of the rack shaft 3.

The second pinion shaft 8B shown in the right side of FIG. 1 is rotationally driven by a motor 12 that serves as a drive force source. In the example embodiment, the second pinion shaft 8B is drivably connected to a shaft via a worm-and-wheel mechanism (not shown). A rack guide 13 is provided on the opposite side of the rack shaft 3 from the second pinion shaft 8B (the upper side in FIG. 1). The rack shaft 3 is in contact with the rack guide 13 such that the rack shaft 3 is slidable on the rack guide 13, and the second rack 7B and the second pinion shaft 8B are in mesh with each other.

In the EPS 1, the rack shaft 3 is supported by the rack guides 11 and 13 such that the rack shaft 3 is moveable in the axial direction. The rotation of the first pinion shaft 8A generated in response to a steering operation is converted into an axial movement of the rack shaft 3 by a first rack-and-pinion mechanism 14A that is constituted of the first pinion shaft 8A and the first rack A. The axial movement of the rack shaft 3 is transferred to knuckles (not shown) via the tie rods 5. As a result, the steered angle of the steered wheels is changed.

The motor 12 produces motor torque corresponding to the steering torque transferred to the steering shaft. In the EPS 1, the rotation of the second pinion shaft 8B driven by the motor 12 is converted into an axial movement of the rack shaft 3 by a second rack-and-pinion mechanism 14B that is constituted of the second pinion shaft 8B and the second rack 7B. In this way, assist force generated by the motor torque is applied to the steering system.

Figure 2:
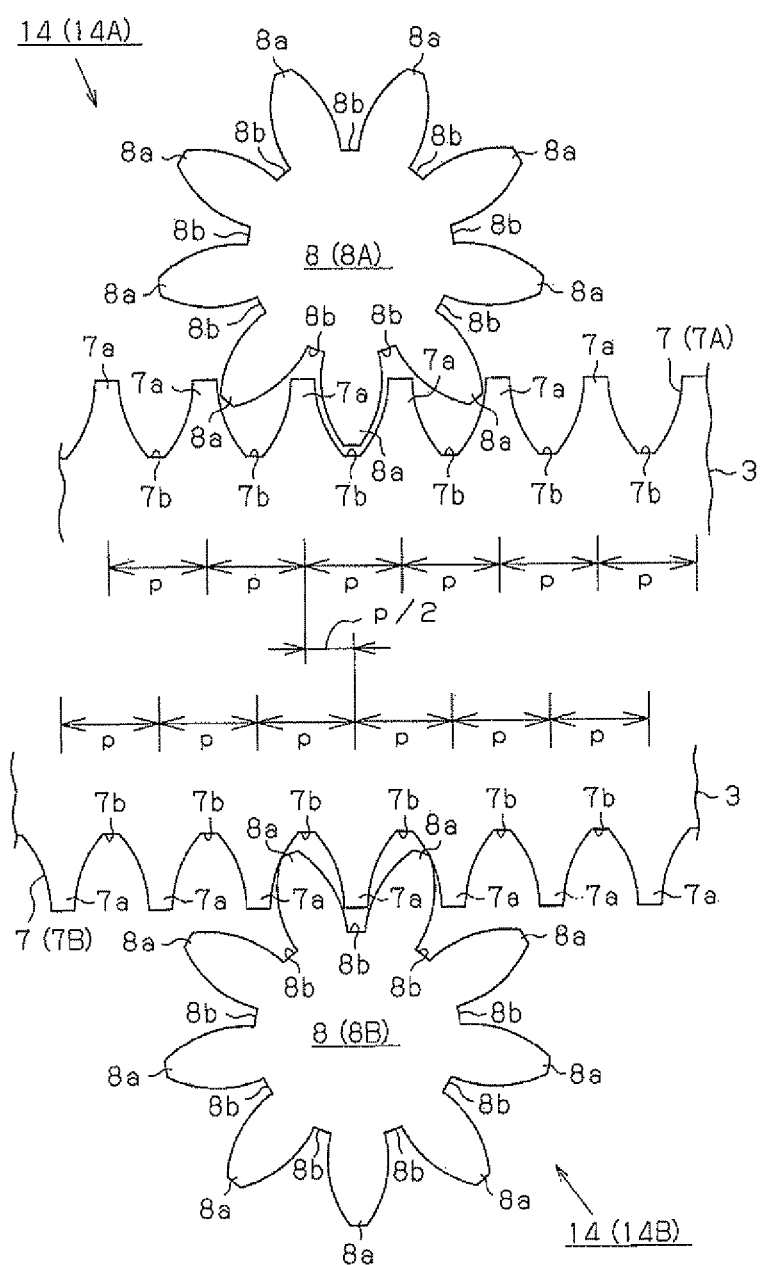
FIG. 2 illustrates views schematically showing a difference between the phase of gear teeth engagement between a pinion shaft and a rack of one of two rack-and-pinion mechanisms and the phase of gear teeth engagement between a pinion shaft and a rack of the other rack-and-pinion mechanism.

More specifically, as shown in FIG. 2, the first rack 7A and the second rack 7B each have a regular pitch p between the rack teeth, and the pitch p of the first rack 7A and the pitch p of the second rack 7B are equal to each other, in the example embodiment. That is, the intervals between the axially consecutive teeth of each rack 7 (7A, 78), that is, the distances between tips 7a of the axially consecutive teeth of each rack 7 (7A, 7B) (and the distances between bottoms 7b of the axially consecutive teeth of each rack 7 (7A, 7B)) are all set to p. In addition, a predetermined difference is set between the phase of gear teeth engagement between the first pinion shaft 8A and the first rack 7A, which constitute the first rack-and-pinion mechanism 14A, and the phase of gear teeth engagement between the second pinion shaft 8B and the second rack 7B, which constitute the second rack-and-pinion mechanism 14B.

More specifically, as shown in FIG. 2, the phase of gear teeth engagement between the first pinion shaft 8A and the first rack 7A and the phase of gear teeth engagement between the second pinion shaft 8B and the second rack 7B are offset from each other such that when a tip 8a of the currently engaging tooth of the first pinion shaft 8A faces the tooth bottom 7b, mating with the currently engaging tooth of the first pinion shaft 8A, of the first rack 7A in the first rack-and-pinion mechanism 14A, the tip 7a of the currently engaging tooth of the second rack 7B faces a tooth bottom 8b, mating with the currently engaging tooth of the second rack 7B, of the second pinion shaft 8B in the second rack-and-pinion mechanism 14B.

One shift of the state of gear teeth engagement between each rack 7 (7A, 7B) and the corresponding pinion shaft 8 (8A, 8B), which occurs as the pinion shaft 8 rotates, is a shift from a state where the tip 8a of the first tooth, currently in engagement, of the pinion shaft 8 faces the tooth bottom 7b, mating with the first tooth of the pinion shaft 8, of the rack 7, to a state where the tooth bottom 8b between the first tooth and the second tooth, next to the first tooth, of the pinion shaft 8 faces the tip 7a of the corresponding tooth of the rack 7, and then to a state where the tip 8a of the second tooth of the pinion shaft 8 faces the tooth bottom 7b, mating with the second tooth of the pinion shaft 8, of the rack 7. One shift of gear teeth engagement state is defined as one cycle (360 degrees) of gear teeth engagement between each rack 7 (7A, 7B) and the corresponding pinion shaft 8 (8A, 8B). In this example embodiment, the gear teeth engagement phase difference between the two rack-and-pinion mechanisms 14 (14A, 14B) is a half of the cycle (180 degrees), which is expressed also as a half of the pitch p (p/2).

As shown in FIG. 1, a distance L1 between an axial center position P1 of the first rack 7A and an axial center position P2 of the second rack 7B is longer, by a half of the pitch p (p/2), than a distance L2 between a position P3 at which the first pinion shaft 8A is in mesh with the first rack 7A and a position P4 at which the second pinion shaft 8B is in mesh with the second rack 7B. That is, the distance L1 between the axial center positions P1 and P2 of the respective racks 7 (7A, 7B) and the distance L2 between the positions P3 and P4 at which the pinion shafts 8 (8A, 8B) are in mesh with the respective racks 7 (7A, 7B) are made different from each other (L1=L2+(p/2). This difference between the distance L1 and the distance L2 creates the above-described gear teeth engagement phase difference between the two rack-and-pinion mechanisms 14 (14A, 14B).

According to the example embodiment, the following effects are obtained.

1) The first rack 7A and the second rack 7B each have a regular pitch p between the teeth, and the pitch p of the first rack 7A and the pitch p of the second rack 7B are equal to each other. Therefore, the cycle of gear teeth engagement between the first rack A and the first pinion shaft 8A and the cycle of gear teeth engagement between the second rack 7B and the second pinion shaft 8B are equal to each other. In such a case, the vibrations caused by gear teeth engagements peak when the phase of gear teeth engagement between the first rack 7A and the first pinion shaft 8A and that between the second rack 7B and the second pinion shaft 8B coincide with each other.

In contrast, the phase of gear teeth engagement between the first rack 7A and the first pinion shaft 8A and that between the second rack 7B and the second pinion shaft 8B are offset from each other in the foregoing structure according to the example embodiment. Therefore, it is possible to prevent the occurrence of the situation where the vibrations, caused by the gear teeth engagements between the first rack 7 and the first pinion shaft 8A and those between the second rack 7B and the second pinion shaft 8B, peak. This allows the EPS 1 to operate highly quietly. The gear teeth engagement phase difference set between the two rack-and-pinion mechanisms 14 (14A, 14B) is constant regardless of the axial position of each pinion shaft 8 (8A, 8B) relative to the corresponding rack 7 (7A, 7B). As a result, the vibrations caused by the gear teeth engagements between the first pinion shaft 8A and the rack shaft 3 (the first rack 7A) and those between the second pinion shaft 8B and the rack shaft 3 (the second rack 7B) are reduced over the entire steering angle range. Further, the level of such vibrations remains unchanged, which reduces the possibility that the occupant(s) of the vehicle may feel the vibrations.

2) The gear teeth engagement phase difference between the two rack-and-pinion mechanisms 14 (14A, 14B) is a half of the pitch p (p/2), that is, a half cycle (180 degrees). Therefore, the vibrations caused by gear teeth engagements at one of the two rack-and-pinion mechanisms 14 (the first rack-and-pinion mechanism 14A) and those caused by gear teeth engagements at the other rack-and-pinion mechanism 14 (the second rack-and-pinion mechanism 14B) cancel out each other. As a result, the vibration level is lowered and the EPS 1 is allowed to operate more quietly.

The foregoing example embodiment may be modified as follows. The position of the one of the racks 7 (7A, 7B) and the position of the other rack 7 are offset from each other by approximately 180 degrees in the circumferential direction of the rack shaft 3 in the foregoing example embodiment. However, the circumferential positional relation between the two racks 7 (7A, 7B) is not limited to this.

The gear teeth engagement phase difference between the two rack-and-pinion mechanisms 14 (14A, 14B) is set to a half of the pitch p (p/2), that is, a half cycle (180 degrees) in the foregoing example embodiment. However, the phase difference is not limited to this, that is, it may be set to, for example, approximately one third of the pitch (p/3).

The distance L1 between the axial center position P1 of the first rack 7A and the axial center position P2 of the second rack 7B is set to be longer, by a half of the pitch p (p/2), than the distance L2 between the position P3 at which the first pinion shaft 8A is in mesh with the first rack 7A and the position P4 at which the second pinion shaft 8B is in mesh with the second rack 7B (L1=L2+(p/2)) in the foregoing example embodiment. However, the difference between the distance L1 and the distance L2 is not limited to this, that is, it may be set according to the gear teeth engagement phase difference between the two rack-and-pinion mechanisms 14 (14A, 14B). For example, the distance L2 between the position P3 at which the first pinion shaft 8A is in mesh with the first rack 7A and the position P4 at which the second pinion shaft 8B is in mesh with the second rack 7B may be set to be longer than the distance L1 between the axial center position P1 of the first rack 7A and the axial center position P2 of the second rack 7B. In this case, for example, the distance L2 may be set to be longer than the distance L1 by a half of the pitch p (p/2) (L1=L2−(p/2)).

The invention is applied to the EPS 1 that includes the first pinion shaft 8A that is rotated in response to an operation of the steering wheel and the second pinion shaft 8B that is rotated by the motor 12 in the foregoing example embodiment. However, applications of the invention are not limited to such an electric power steering system. That is, for example, the invention may be applied to a steer-by-wire vehicle steering system in which a first pinion shaft and a second pinion shaft are rotated by respective motors.

The two pinion shafts 8 (8A, 8B) are provided and they are respectively in mesh with the two racks 7 (7A and 7B) formed in the rack shaft 3 in the foregoing example embodiment. However, the invention is not limited to such an arrangement. That is, for example, the number of pinion shafts and the number of racks may each be three or more, as long as multiple pinion shafts are individually provided and multiple racks are provided to be in mesh with the respective pinion shafts. In this case as well, the gear teeth engagement phases of the respective sets of the rack and the pinion shaft are offset from each other.

What is claimed is:

1. A vehicle steering system, comprising:
    a plurality of pinion shafts, each pinion shaft having gear teeth; and
    a rack shaft that has a plurality of racks, each rack having rack teeth, the rack teeth of each rack being in meshing engagement with the gear teeth of respective pinion shafts, and the rack shaft being axially moveable, wherein
    the rack teeth of each of the racks have a regular pitch between the rack teeth, the pitches of the rack teeth of the respective racks are equal to each other, and engagement phases of the respective meshing engagements of the rack teeth and the gear teeth are offset from each other.

2. An electric power steering system comprising the vehicle steering system according to claim 1.

3. The electric power steering system, according to claim 2, wherein:
    the plurality of pinion shafts includes a first pinion shaft that is rotated in response to an operation of a steering wheel and a second pinion shaft that is rotated by a motor;
    the plurality of racks includes a first rack and a second rack, the rack teeth of the first rack being in meshing engagement with the gear teeth of the first pinion shaft and the rack teeth of the second rack being in meshing engagement with the gear teeth of the second pinion shaft;
    the rack teeth of the first rack have a regular pitch, the rack teeth of the second rack have a regular pitch, and the pitch of the rack teeth of the first rack and the pitch of the rack teeth of the second rack are equal to each other; and
    a phase of meshing engagement between the gear teeth of the first pinion shaft and the rack teeth of the first rack and a phase of meshing engagement between the gear teeth of the second pinion shaft and the rack teeth of the second rack are offset from each other.

4. The electric power steering system according to claim 3, wherein the first rack is disposed on the rack shaft at a location circumferentially offset from a location of the second rack.

5. The electric power steering system according to claim 4, wherein
    the first rack and the second rack are circumferentially offset by 180 degrees.

6. The electric power steering system according to claim 3, wherein
    the phase of meshing engagement between the gear teeth of the first pinion shaft and the rack teeth of the first rack and the phase of meshing engagement between the gear teeth of the second pinion shaft and the rack teeth of the second rack are offset from each other by a half of the pitch of the rack teeth of the first and second racks.

7. The electric power steering system according to claim 3, wherein
    a first distance defines a length between an axial center position of the first rack and an axial center position of the second rack,
    a second distance defines a length between a first position at which the gear teeth of the first pinion shaft are in meshing engagement with the rack teeth of the first rack and a second position at which the gear teeth of the second pinion shaft are in meshing engagement with the rack teeth of the second rack, and
    the first distance is not equal to the second distance.

8. The electric power steering system according to claim 7, wherein
a difference between the first distance and the second distance is one half of the pitch of the rack teeth of the first and second racks.

\* \* \* \* \*